United States Patent [19]
Addeo et al.

[11] Patent Number: 5,445,781
[45] Date of Patent: Aug. 29, 1995

[54] PROCESS FOR THE INJECTION MOLDING OF NON-PRECATALYZED POLYMERIZABLE RESINS AT HIGH-PRESSURE AND FLOW

[75] Inventors: Antonio Addeo, Novara; Francesco D'Oria; Roberto Bonari, both of Milano, all of Italy

[73] Assignee: Centro Sviluppo Settori Impiego S.r.l., Italy

[21] Appl. No.: 167,555

[22] Filed: Dec. 15, 1993

Related U.S. Application Data

[63] Continuation-in-part of Ser. No. 934,425, Aug. 24, 1992, abandoned.

[30] Foreign Application Priority Data

Aug. 28, 1991 [IT] Italy ................................ MI91A2306

[51] Int. Cl.⁶ .......................... B29B 7/76; B29C 67/24
[52] U.S. Cl. .................................. 264/328.6; 422/131

[58] Field of Search ..................... 264/328.6; 425/543; 422/131, 133; 366/154, 159, 173

[56] References Cited

U.S. PATENT DOCUMENTS

| | | | |
|---|---|---|---|
| 2,885,268 | 5/1959 | Breer et al. | 264/328.6 |
| 3,102,004 | 8/1963 | Grintz . | |
| 4,344,919 | 8/1982 | Kelterbaum | 425/543 |
| 4,473,531 | 9/1984 | Macosko et al. | 422/133 |
| 4,503,014 | 3/1985 | Bauer | 422/133 |
| 4,707,339 | 11/1987 | Johnson et al. | 422/133 |
| 5,093,084 | 3/1992 | Boden et al. | 422/133 |

*Primary Examiner*—Jill L. Heitbrink
*Attorney, Agent, or Firm*—David M. Klein; Bryan Cave

[57] ABSTRACT

An improved method for injection molding of non-precatalyzed resins in which the catalyst and resin flows are injected in a mixing chamber co-current with one another angled toward the ejectment end of the mixing chamber, The resin flow is injected closer to the ejectment end of the mixing chamber than is the catalyst flow.

7 Claims, 6 Drawing Sheets

SECTION A-A

SECTION A-A

SECTION B-B

SECTION A-A

SECTION A-A

SECTION B-B

SECTION A-A

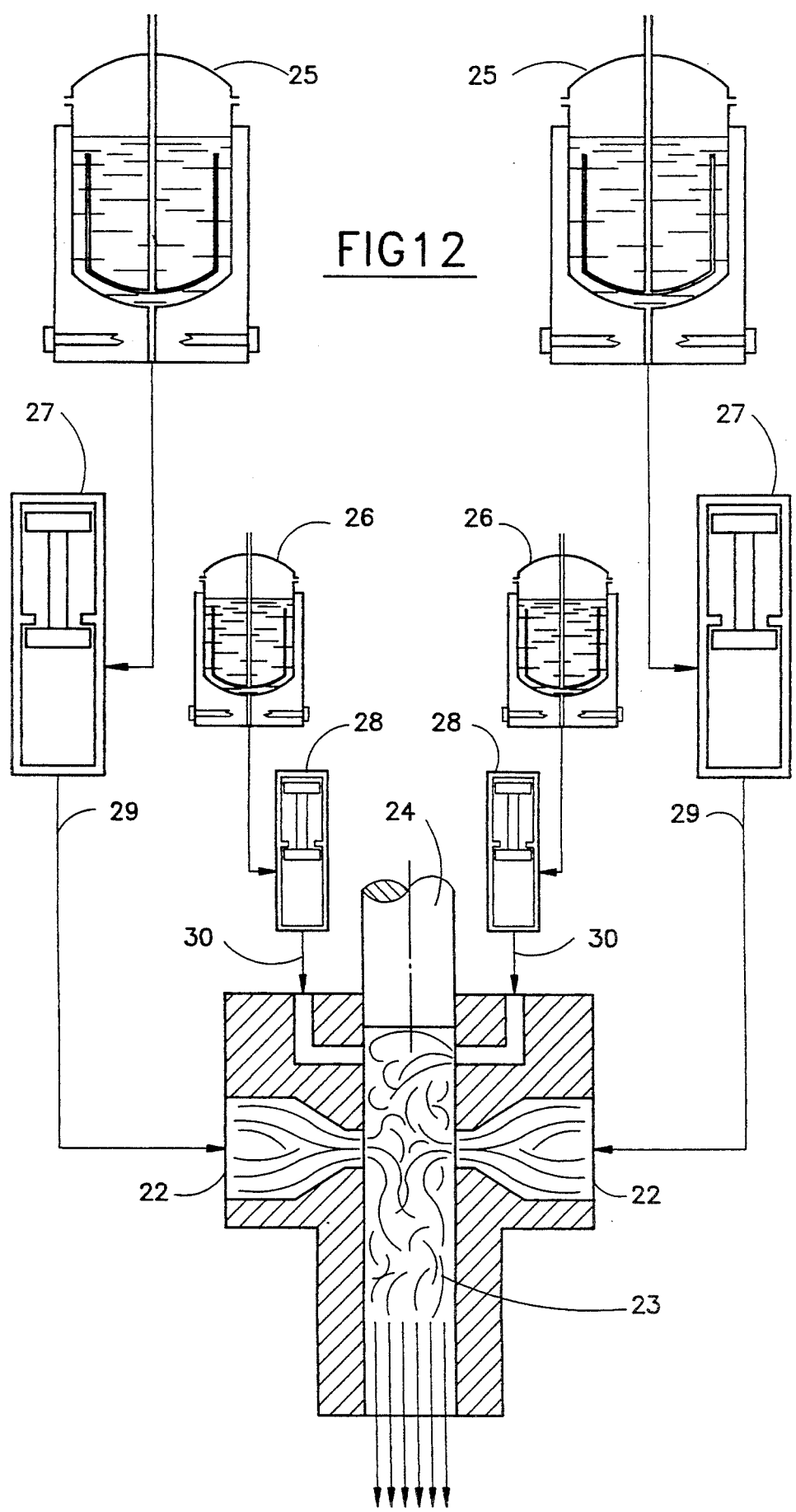

PROCESS FOR THE INJECTION MOLDING OF NON-PRECATALYZED POLYMERIZABLE RESINS AT HIGH-PRESSURE AND FLOW

CROSS-REFERENCE TO RELATED APPLICATIONS

This is a continuation-in-part of U.S. patent application Ser. No. 07/934,425, filed Aug. 24, 1992 now abandoned.

BACKGROUND OF THE INVENTION

1. Field of the Invention

The present invention relates to a process for the injection of a system of one or more non-precatalyzed, polymerizable, monocomponent or hybrid resins at high pressure and at high flow.

2. Description of the Prior Art

In the field of injection molding, many different processes have been developed in an attempt to economically produce molded articles. It is well known in Resin Transfer Molding (RTM) technology that a flow consisting of a thermosetting monomer and catalyst (monocomponent system) can be premixed in a proper mixing head and pumped at low pressures (2–5 atmospheres) into a properly preheated mold where the polymerization reaction will occur.

The use of a low molding pressure permits the use of less expensive molds which are made of relatively weak materials. However, the low molding pressure makes the process quite slow, particularly when the molded articles are large. With this type of process, the maximum delivery of the metering pumps are not very high and typically do not exceed 100–150 cc/second.

Furthermore, after the conclusion of the mixing/injection (shot) step it is necessary to use a solvent to clean the mixer. Obviously this slows the manufacturing cycle and creates the need for disposal of the used solvents.

To overcome these drawbacks, monocomponent resin/catalyst systems have been prepared which are endowed with rapid polymerization kinetics and which are characterized by total cross-linking times of less than 5 minutes. These systems, however, are also significantly slowed by the low pressure injection step, which results in a significantly slower process than that potentially permitted by the above-mentioned kinetic characteristics.

A further method of reducing production cycle time in injection molding processes uses RIM (Reaction Injection Molding) machines. These machines mix the resin and catalyst flows by injecting them separately at high pressures into a mixing chamber. The RIM technology is based on the impingement of two opposed flows injected by means of suitable nozzles in a mixing head equipped with a self-cleaning piston system. The RIM system eliminates the need to clean the chamber after each production cycle. Additionally, the self-cleaning piston is capable of expelling from the chamber the residual material after the shot.

When the RIM technology is applied to monocomponent resins the latter are divided into two flows. One is composed of basic resin and accelerator while the other is composed of basic resin and catalyst. These two flows are mixed in the RIM mixing chamber in opposing flows.

This method, although it permits acceleration of the monocomponent resin molding cycle, results in instability because one flow of resin is already catalyzed. This instability, creates difficulties during the storage of the flow prior to mixing. Additionally, it can give rise to undesired polymerizations resulting from localized overheating phenomena which can occur during the process at different points in the production plant.

One possible solution to the problems resulting from pre-mixing the resin and catalyst is to keep them separate until the resin is actually present in the mold. In other words, the resin and the catalyst are mixed in the mold. Two separate flows, resin and catalyst, are injected into a mixing chamber where the polymerization reaction can take place. After the reaction is complete, the self-cleaning piston ejects the molded article from the chamber and the next cycle can begin.

The major challenge in such a system is to ensure that the flows mix properly so that proper catalyst dosage is given to the resin flow in all regions of the mixing chamber. This step is critical, since failure results in less than optimal polymerization conditions in the mixing chamber, which in turn creates poor mechanical properties in the final product.

One method of solving the mixing problem is exemplified by Japanese Patent Document JP 60-193624 in which two separate resin flows are injected into the mixing chamber. The catalyst is injected through an injection nozzle which is positioned so that the catalyst is injected directly at the resin injection nozzle. This puts the resin and catalyst flows in "counter-current" with each other.

In practice the mixing of the flows obtained by placing them in counter-current with each other is not satisfactory because it results in catalyst segregation and poor properties in the final product. Furthermore, the opposed positioning of the resin and catalyst injection nozzles as exemplified by JP 60-193624 creates a tendency for unpolymerized resin to become lodged in the catalyst injection nozzle, where it subsequently polymerizes and clogs the nozzle.

Other devices in which the resin and catalyst flows are not directly opposed, such as German Patent Document DE 2,314,459, do not overcome the mixing problems which lead to less than ideal final product quality.

SUMMARY OF THE INVENTION

The present invention is an improved process for the injection molding of one or more non-precatalyzed, polymerizable monocomponents or hybrid resins at high pressures and flows which optimizes the mixing of the catalyst and resin flows and results in improved final product quality. The process uses a differentiated feeding of the non-precatalyzed monomers and of the catalytic system to a mixing chamber where, due to the orientation of the injection nozzles, the resin and catalyst flows merge rather than collide (that is, they are said to be in co-current with each other) This orientation produces outstanding mixing and polymerization results.

The term "non-precatalyzed, polymerizable resins" is used in the present specification and in the claims mainly to designate the thermoplastic resins, for example anionic PA, or thermosetting resins, for example unsaturated polyester resins, or hybrid resins, for example IPN, properly catalyzed.

After the polymerization reaction occurs the resulting polymeric material is ejected from the mixing chamber by a self-cleaning molding piston.

It is an object of the present invention to provide an improved process for the injection molding of systems of one or more non-precatalyzed, polymerizable, monocomponent or hybrid resins at high pressures and flows which comprises:
- a) providing a mixing head comprising a cylindrical mixing chamber having a closed end and an ejectment end, and a self-cleaning molding piston;
- b) withdrawing from a storage tank at least one flow comprising a non-precatalyzed polymerizable monocomponent or hybrid resin;
- c) withdrawing from a storage tank at least one flow comprising at least one catalyst;
- d) injecting each flow at high pressure into the cylindrical mixing chamber through at least one catalyst injection nozzle and at least one resin injection nozzle; and
- e) discharging the resulting polymer from the mixing chamber with the self-cleaning molding piston.

A further improvement comprises having the injection nozzles positioned and oriented so that:
- (i) the resin injection nozzle(s) is (are) positioned closer to the ejectment end relative to the catalyst injection nozzle(s).
- (ii) the catalyst injection nozzle(s) is (are) angled towards the ejectment end;
- (iii) the resin injection nozzle(s) is (are) angled towards the ejectment end.

The positioning and orientation of the injection nozzles in critical. First, by having all injections made in the direction of the ejectment end the incoming flows are co-current with one another.

In a preferred embodiment of the process of the present invention, two resin flows are fed through two injection nozzles while the catalyst flow is fed through a third injection nozzle.

According to another preferred embodiment of the process of the present invention, there are two catalyst flows which are fed to the mixing chamber through two separate injection nozzles.

The flow rates of the polymerizable resin and of the catalyst are dependent on several factors, including, for example, the dimensions of the mixing chamber and of the articles to be produced, while the injection pressures range from 1 to 300 bar. The weight ratios of resin to catalyst range from 10:1 to 2000:1.

The apparatus for the injection molding of non-precatalyzed, polymerizable, monocomponent or hybrid resins at high pressure and high flow of the present invention preferably comprises:
- a) at least one storage tank for the polymerizable resin;
- b) at least one storage tank for the catalyst;
- c) a mixing head equipped with a cylindrical mixing chamber comprising:
  - (i) a self-cleaning molding piston which is capable of sliding within the mixing chamber between a withdrawn position and an ejection position where it ejects the polymerized material;
  - (ii) a catalyst injection nozzle which;
  - (iii) a resin injection nozzle; and
- d) means, for example positive-displacement pumps, for withdrawing resin and catalyst from their respective tanks and injecting them into the mixing chamber through the injection nozzles.

In a further embodiment:
- (i) the resin injection nozzle(s) is (are) positioned closer to the ejectment end relative to the catalyst injection nozzle(s).
- (ii) the catalyst injection nozzle(s) is (are) angled towards the ejectment end;
- (iii) the resin injection nozzle(s) is (are) angled towards the ejectment end.

Another feature of the process and apparatus of the invention is the inclusion of cutaways in the piston which are aligned with an injection nozzle and a recycling outlet from the mixing chamber. When the piston is in the ejection position the cutaways permit the flow from an injection nozzle to pass through to the recycling outlet, from where it can be recycled to the injection nozzle.

A still further feature of the invention is that the injection nozzles for the catalyst and resin are not opposed. Rather, if three injection nozzles are in the chamber, the nozzles are spaced at 120 degrees around the cylinder. If four nozzles are present, the two catalyst nozzles are opposed, and the two resin nozzles are opposed.

The improved process for the injection molding of non-recatalyzed, polymerizable, monocomponent or hybrid resins which is an object of the present invention can be better understood from the following detailed description, in which reference is made to the figures of the annexed drawings illustrating examples of apparatuses, which can be used for executing the process.

BRIEF DESCRIPTION OF THE DRAWINGS

FIG. 12 shows an embodiment of the present invention in which the mixing head has four inlets, two of which for the resins and two for the catalysts.

DETAILED DESCRIPTION OF THE DRAWINGS

Figure 1:
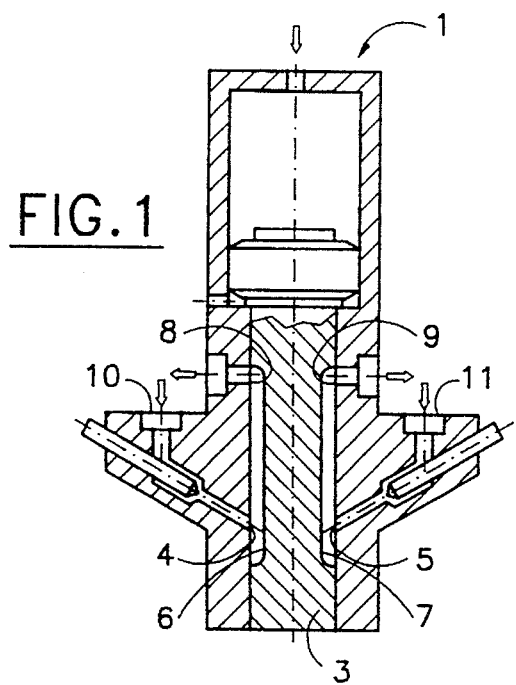
FIG. 1 is a cross-sectional view of an embodiment of the mixing head of the present invention through Section A—A.

As shown in FIGS. 1–4 the present invention includes a mixing head i comprising a mixing chamber 2 and a self-cleaning molding piston 3. Two resin injection nozzles 4 and 5 are provided for injecting the resin into the mixing chamber 2. The self-cleaning piston has cutaways 6 and 7 which are aligned with the resin injection points 4 and 5 and recycling outlets 8 and 9. When the piston 3 is in the ejectment position, as shown in FIG. 1, the cutaways 6 and 7 permit the resin flow to enter the mixing chamber 2 through resin injection nozzles 4 and 5 and to be directed into recycling outlets 8 and 9. This enables excess resin flow to be redirected to the resin injection nozzles 4 and 5 via recycling input valves 10 and 11.

Catalyst flow enters the mixing chamber through catalyst injection nozzle 12. When molding piston 3 is in the ejectment position, cutaway 13 permits the catalyst flow to pass through to catalyst recycling outlet 14, from where it can eventually return to catalyst injection nozzle 12 via catalyst recycling input valve 15.

Figure 2:
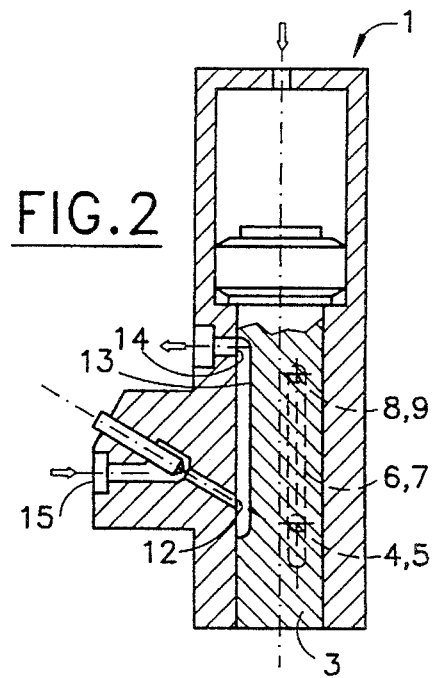
FIG. 2 is a cross-sectional view of the embodiment shown in FIG. 1 through Section B—B.
Figure 3:
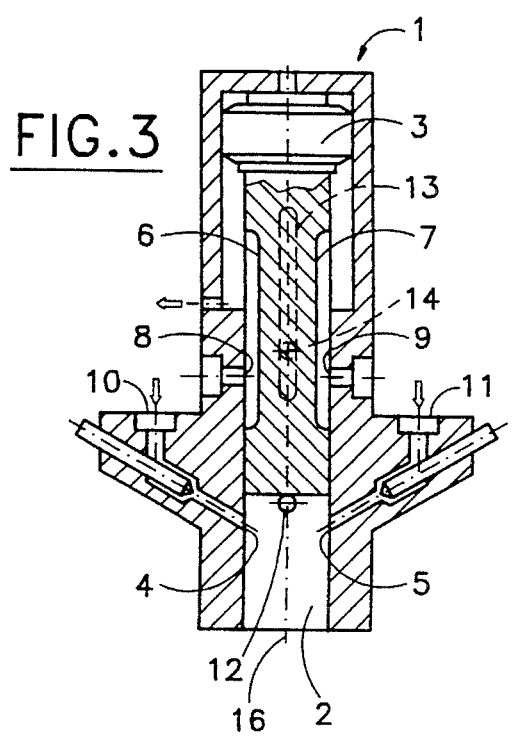
FIG. 3 is a cross-sectional view of the embodiment shown in FIG. 1 through Section A—A with the piston withdrawn.
Figure 4:
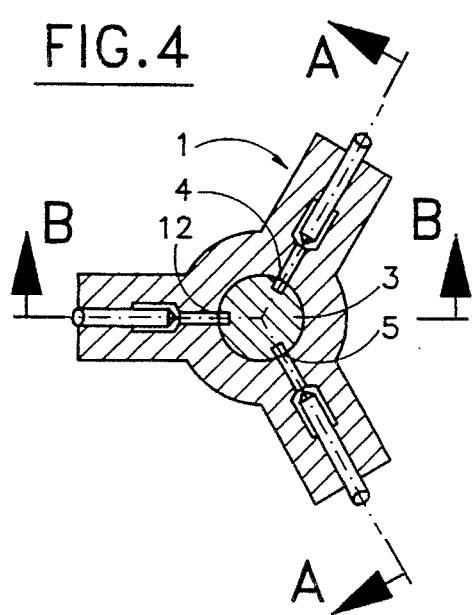
FIG. 4 is a top cross-sectional view of the embodiment as shown in FIGS. 1–3.
Figure 5:
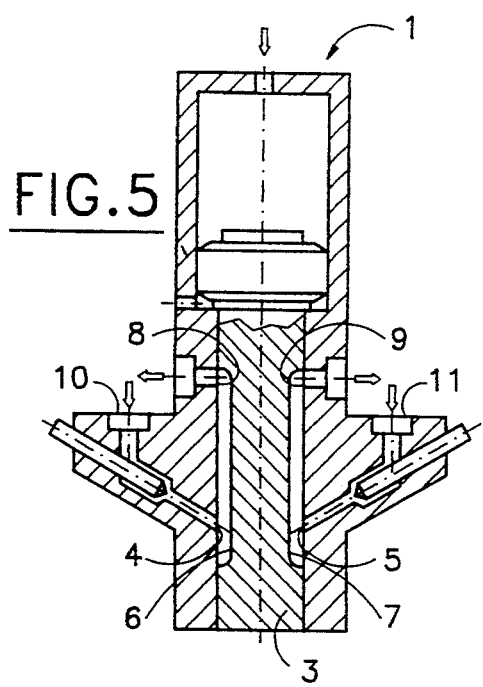
FIG. 5 is a cross-sectional view of an alternative embodiment of the mixing head of the present invention through Section A—A.
Figure 6:
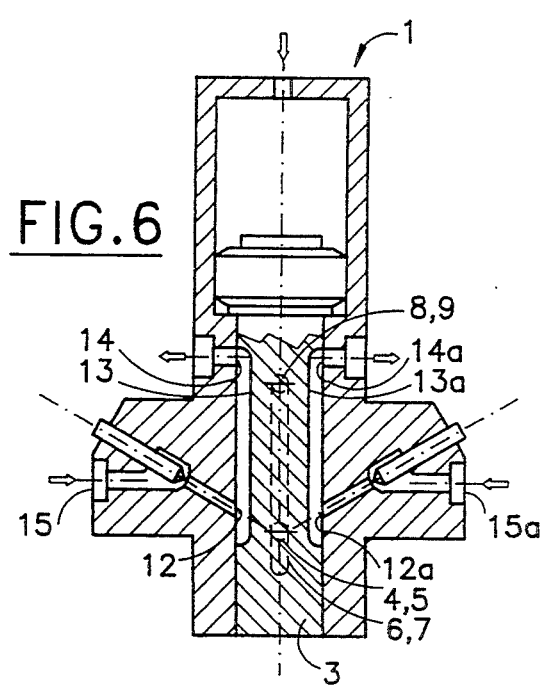
FIG. 6 is a cross-sectional view of the embodiment shown in FIG. 5 through Section B—B.
Figure 7:
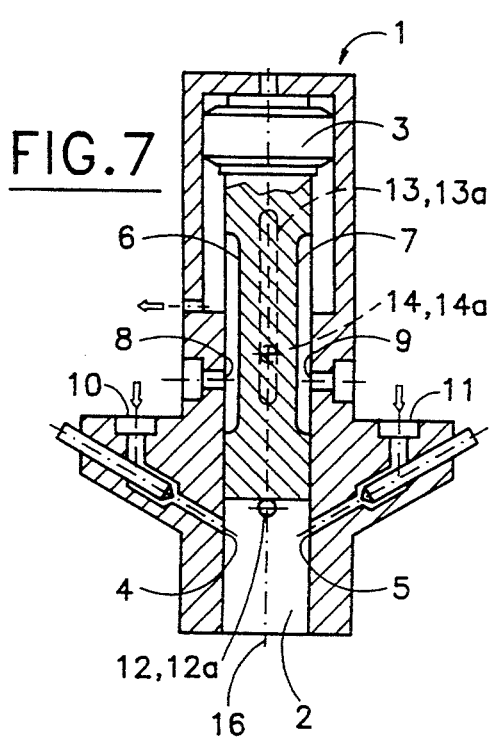
FIG. 7 is a cross-sectional view of the embodiment shown in FIG. 5 through Section A—A with the piston withdrawn.
Figure 8:
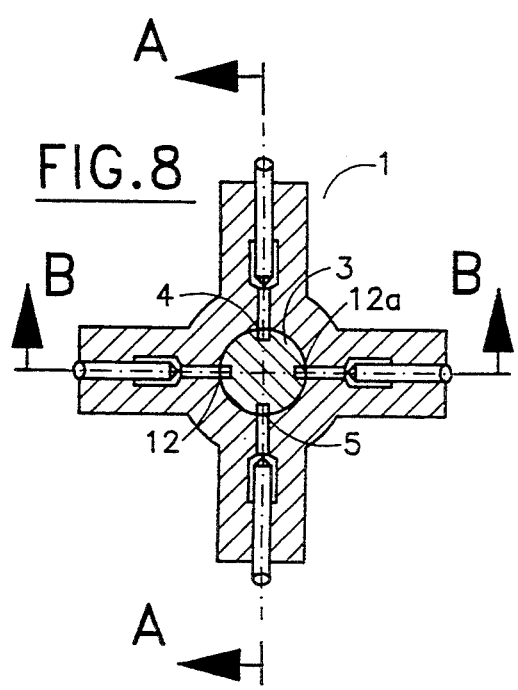
FIG. 8 is a top cross-sectional view of the embodiment as shown in FIGS. 5–7.
Figure 9:
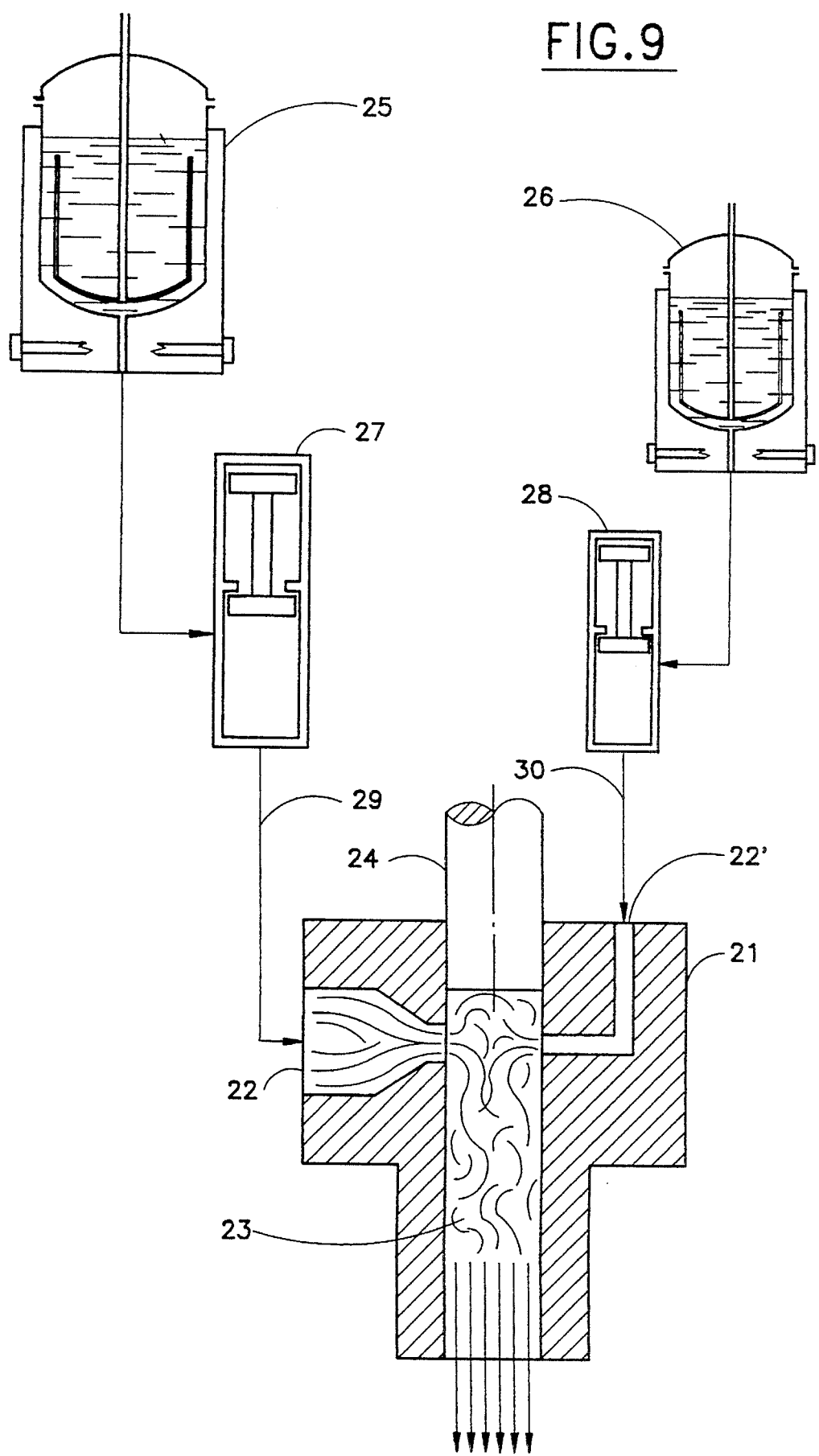
FIG. 9 shows an embodiment of the present invention equipped with a mixing head having only two inlets.
Figure 10:
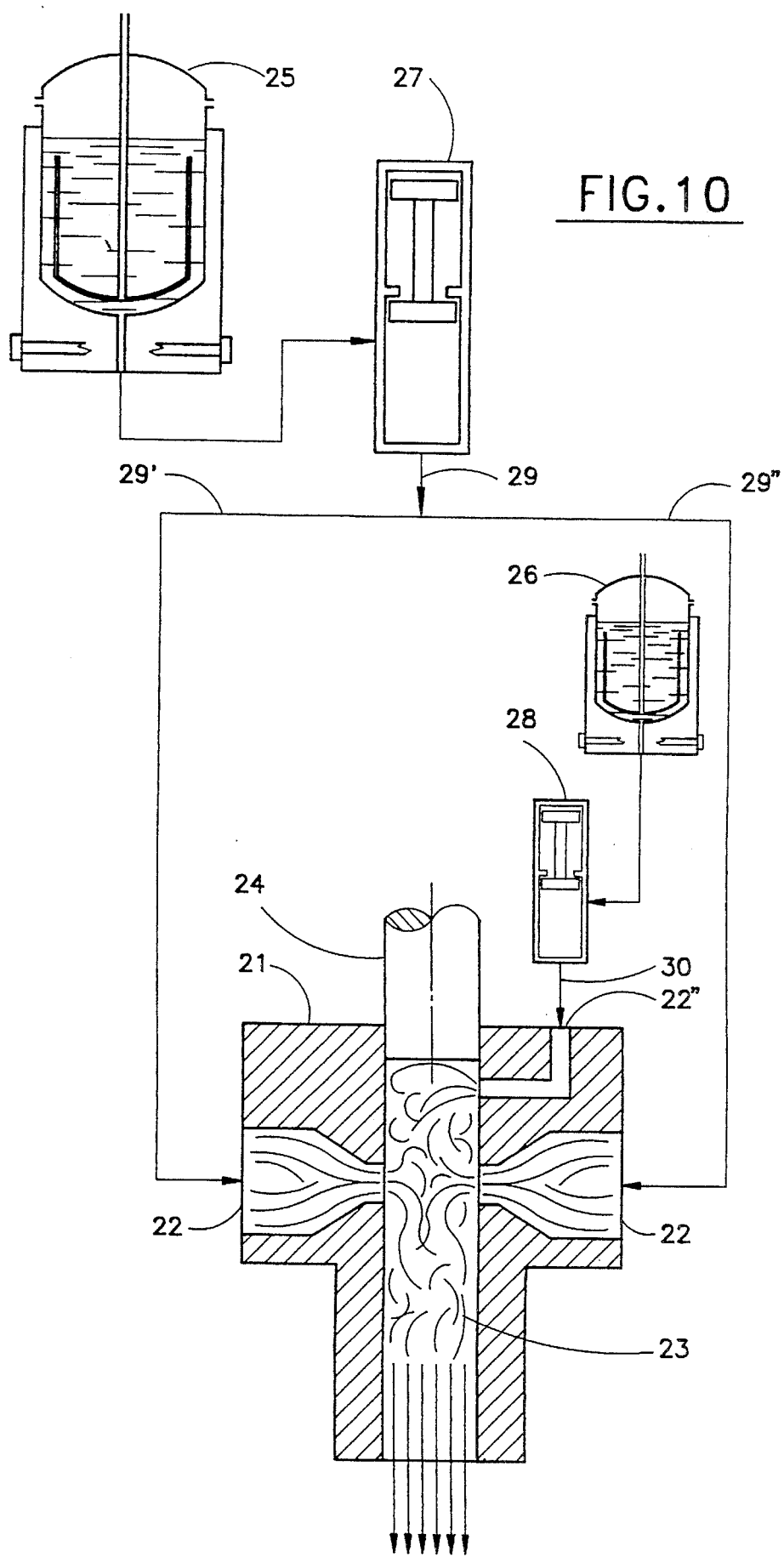
FIG. 10 shows an embodiment of the present invention in which the mixing head has three inlets, one of which feeds the catalyst and the other two feed only one non-precatalyzed polymerizable resin.
Figure 11:
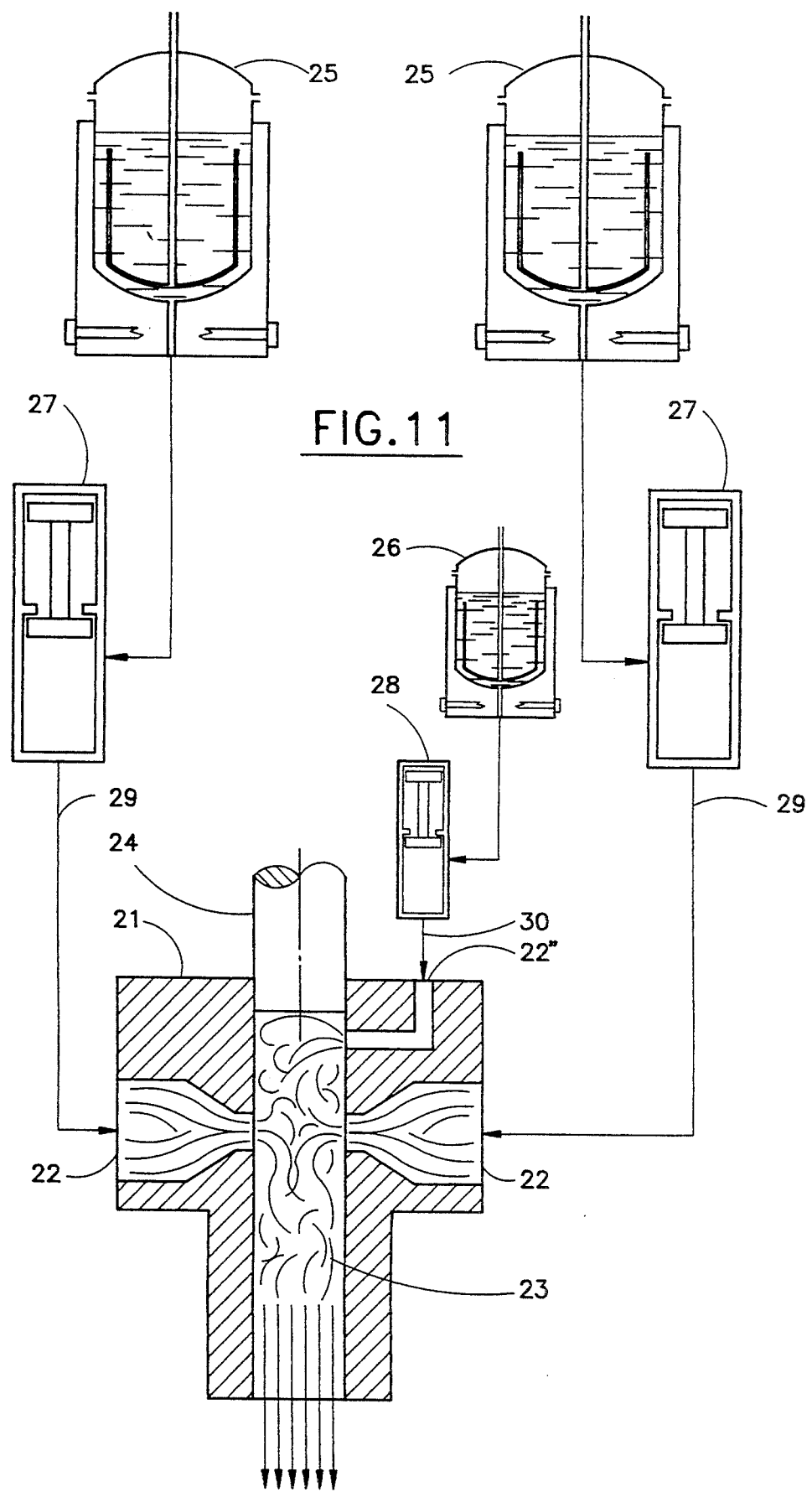
FIG. 11 shows an embodiment of the present invention in which the mixing head has three inlets, one of which feeds the catalyst and the other two feed two different non-precatalyzed polymerizable resins.

As shown clearly in FIGS. 2 and 3, each of the nozzles 4, 5 and 12 are angled downwardly in the ejectment direction of the piston 3. The axis of resin injection nozzles 4 and 5 intersects the center longitudinal axis 16 of the mixing cylinder 2 at a point downstream (i.e. toward the ejectment end) of the intersection of the axis of the catalyst injection nozzle 12 with the axis 16. Consequently, the catalyst and resin flows are being injected into mixing chamber 2 through injection nozzles 12, 4 and 5 co-currently, i.e. flowing generally in the same longitudinal direction. This permits precise mixing of the catalyst flow with the resin flows in a resin:catalyst weight ratio range of 10:1 to 2000:1. Additionally, the nozzles for the catalyst and resin are not opposed. This eliminates the potential for clogging the catalyst or resin injection nozzles. As shown in FIG. 4, the injection nozzles are spaced approximately 120 degrees from each other.

FIGS. 5–8 show an alternative embodiment of the invention wherein the catalyst flow is injected into the mixing chamber through two catalyst injection nozzles 12 and 12a. In this embodiment, the nozzles are spaced at 90° from one another, with the catalyst nozzles 12 and 12a being across from one another and the resin nozzles 4 and 5 being across from one another.

In another series of embodiments shown in FIGS. 9–12, the non-precatalyzed polymerizable resin and the catalyst are withdrawn from the respective tanks (25) and (26) by means of pumps (27) and (28) and, through lines (29) and (30), are injected into mixing head (21), at inlets (22) and (22').

On conclusion of the injection, the mixture which has formed in chamber (23) is discharged by means of self-cleaning piston (24). In this way it is possible to overcome all the problems described hereinbefore, in particular the ones connected with the injection of precatalyzed systems. Furthermore, a self-cleaning system for the head is realized, which prevents the polymerized residues from stagnating inside the head.

In the practical embodiment of the present invention, various changes, modifications and variations can be brought to the different parts which form the apparatuses used for the injection molding of non-precatalyzed, polymerizable, monocomponent or hybrid resins at high pressure and flow which are illustrated, as an exemplification, in the annexed figures of the drawings, without departing from the spirit and the scope of the invention.

We claim:

1. In a process for the injection molding of at least one non-precatalyzed, polymerizable monocomponent or hybrid resin at high pressure and flow which comprises the steps of:
    a) providing a mixing head comprising a cylindrical mixing chamber having a closed end and an ejectment end, and a self-cleaning molding piston;
    b) withdrawing from a storage tank at least one flow comprising a non-precatalyzed polymerizable monocomponent or hybrid resin;
    c) withdrawing from a storage tank at least one flow comprising at least one catalyst;
    d) injecting each flow at high pressure into the mixing chamber through at least one catalyst injection nozzle and at least one resin injection nozzle;
    e) discharging the resulting polymer from the mixing chamber with the self-cleaning molding piston;
   wherein the improvement comprises:
    (i) positioning the resin nozzles disposed closer to the ejectment end than the catalyst injection nozzles;
    (ii) injecting the catalyst through the catalyst injection nozzles angled towards the ejectment end; and
    (iii) injecting the resin through the resin injection nozzles angled towards the ejectment end of the mixing chamber.

2. The process of claim 1 wherein the mixing chamber further comprises:
    at least one recycling outlet aligned longitudinally with an injection nozzle; and
    the self-cleaning molding piston further comprises at least one cutaway longitudinally aligned with an injection nozzle and the recycling outlet whereby a flow from the ejectment nozzle passes from the injection nozzle to the recycling outlet via the cutaway when the piston is in the ejectment position.

3. The process of claim 2 wherein each injection nozzle has a corresponding recycling outlet and piston cutaway.

4. The process of claim 1 wherein the mixing chamber comprises two resin injection nozzles and one catalyst injection nozzle.

5. The process of claim 3 wherein the three injection nozzles are arranged about 120° apart from each other.

6. The process of claim 1 wherein the mixing chamber comprises two resin injection nozzles and two catalyst injection nozzles.

7. The process of claim 6 wherein the four injection nozzles are arranged about 90° from one another, and the two resin injection nozzles are opposed from one another and the two catalyst injection nozzles are opposed from one another.

* * * * *